(12) United States Patent
Thibodeaux

(10) Patent No.: US 6,185,860 B1
(45) Date of Patent: Feb. 13, 2001

(54) FISHERMAN'S COOLER

(76) Inventor: Lucius J. Thibodeaux, 5591 Hwy. 56, Chauvin, LA (US) 70344

(*) Notice: Under 35 U.S.C. 154(b), the term of this patent shall be extended for 0 days.

(21) Appl. No.: 09/358,027

(22) Filed: Jul. 21, 1999

(51) Int. Cl.$^7$ .......................... A01K 97/00; A01K 97/10
(52) U.S. Cl. ..................... 43/54.1; 43/21.2; 206/315.11; 62/457.7
(58) Field of Search ................................ 43/21.2, 54.1; 206/315.11; D22/147, 148; 62/457.7

(56) References Cited

U.S. PATENT DOCUMENTS

| | | |
|---|---|---|
| D. 308,915 * | 8/1999 | Lanius ................................ D22/148 |
| 2,936,066 * | 5/1960 | Meksula ........................ 206/315.11 |
| 3,877,144 * | 4/1975 | LeBlanc ............................... 43/54.1 |
| 4,128,170 * | 12/1978 | Elliott .................................. 43/54.1 |
| 4,311,262 * | 1/1982 | Morin .................................. 43/54.1 |
| 4,353,182 | 10/1982 | Junkas et al. . |
| 4,747,490 * | 5/1988 | Smith .............................. 206/315.11 |
| 4,841,661 | 6/1989 | Moore . |
| 4,845,881 | 7/1989 | Ward . |
| 5,054,228 | 10/1991 | Elkins . |
| 5,100,198 | 3/1992 | Baltzell . |
| 5,159,777 | 11/1992 | Gonzalez . |
| 5,209,009 * | 5/1993 | Fast ...................................... 43/54.1 |
| 5,305,544 | 4/1994 | Testa, Jr. . |
| 5,331,761 | 7/1994 | Kuthy . |
| 5,347,746 | 9/1994 | Letson . |
| 5,471,779 | 12/1995 | Downey . |
| 5,636,469 * | 6/1997 | Pizzolo ................................. 43/54.1 |
| 5,709,307 * | 1/1998 | Rosado ............................... 62/457.7 |
| 5,938,023 * | 8/1999 | Herron ............................ 206/315.11 |

* cited by examiner

*Primary Examiner*—Kurt Rowan
(74) *Attorney, Agent, or Firm*—Kenneth L Tolar

(57) ABSTRACT

A fisherman's cooler includes a box-shaped container having a pivotable lid for covering a substantially open top portion. The lid includes an indented portion on its upper surface having measuring indicia therein for assisting a fisherman in measuring a fish. The top portion of the container includes a plurality of fishing rod holders, the diameter of which may be varied to support varying diameter fishing rods. An accessory shelf is hingedly attached to the front wall of the container for supporting various accessory items thereon. The accessory shelf may be locked in a horizontal position with a locking mechanism.

4 Claims, 2 Drawing Sheets

FISHERMAN'S COOLER

BACKGROUND OF THE INVENTION

The present invention relates to a fisherman's cooler including a plurality of fishing rod holders, a fish measuring device and a fold-out accessory shelf.

DESCRIPTION OF THE PRIOR ART

Fishermen typically use an ice chest to store fish, beverages and food items. Such fishermen must often transport numerous items including numerous fishing rods and various accessory items. The present invention relates to a uniquely configured cooler that allows a fishermen to simultaneously transport a plurality of fishing rods and a cooler thereby eliminating multiple trips between the fishing location and a vehicle. Various fishing tackle boxes, coolers and storage devices exist in the prior art. For example, U.S. Pat. No. 5,471,779 issued to Downey relates to a fishing chest having a seat and lid pivotably coupled thereto as well as a rod holder.

U.S. Pat. No. 5,305,544 issued to Testa, Jr. relates to a bait storage, cooler and tackle holder arrangement. The device includes a multi-compartment insulated chest for storing both bait and food.

U.S. Pat. No. 5,159,777 issued to Gonzalez relates to a fishing cart apparatus including a cooler mounted thereon.

U.S. Pat. No. 5,100,198 issued to Baltzell relates to a seat cooler apparatus.

Although various fisherman's coolers exist in the prior art, at least one of which that has a rod holder, the devices are inferior to the present invention. The rod holder in Downey has a fixed diameter so that certain size fishing rods will easily shift and possibly fall out of the holder. The present invention includes a plurality of diameter adjustable fishing rod holders for tightly supporting varying diameter fishing rods.

SUMMARY OF THE INVENTION

The present invention relates to a fisherman's cooler including a substantially box-shaped container having a front wall, a rear wall, a pair of side walls therebetween, a bottom surface and a top portion. The top portion of the container is open and is coverable with a pivotable lid. The upper surface of the lid includes a recessed portion with a ruler integral therewith for receiving and measuring a fish. An accessory shelf hingedly engages the front wall of the container which may be pivoted and locked in a horizontal position to store accessory items thereon. The top portion of the cooler includes a fishing rod holder adjacent each corner thereof for supporting a fishing rod. It is therefore an object of the present invention to provide a fisherman's cooler having a plurality of fishing rod support means thereon.

It is another object of the present invention to provide a fisherman's cooler that includes a means for conveniently measuring a fish.

It is yet another object of the present invention to provide a fisherman's cooler having a fold out shelf allowing accessory items to be conveniently supported thereon. Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
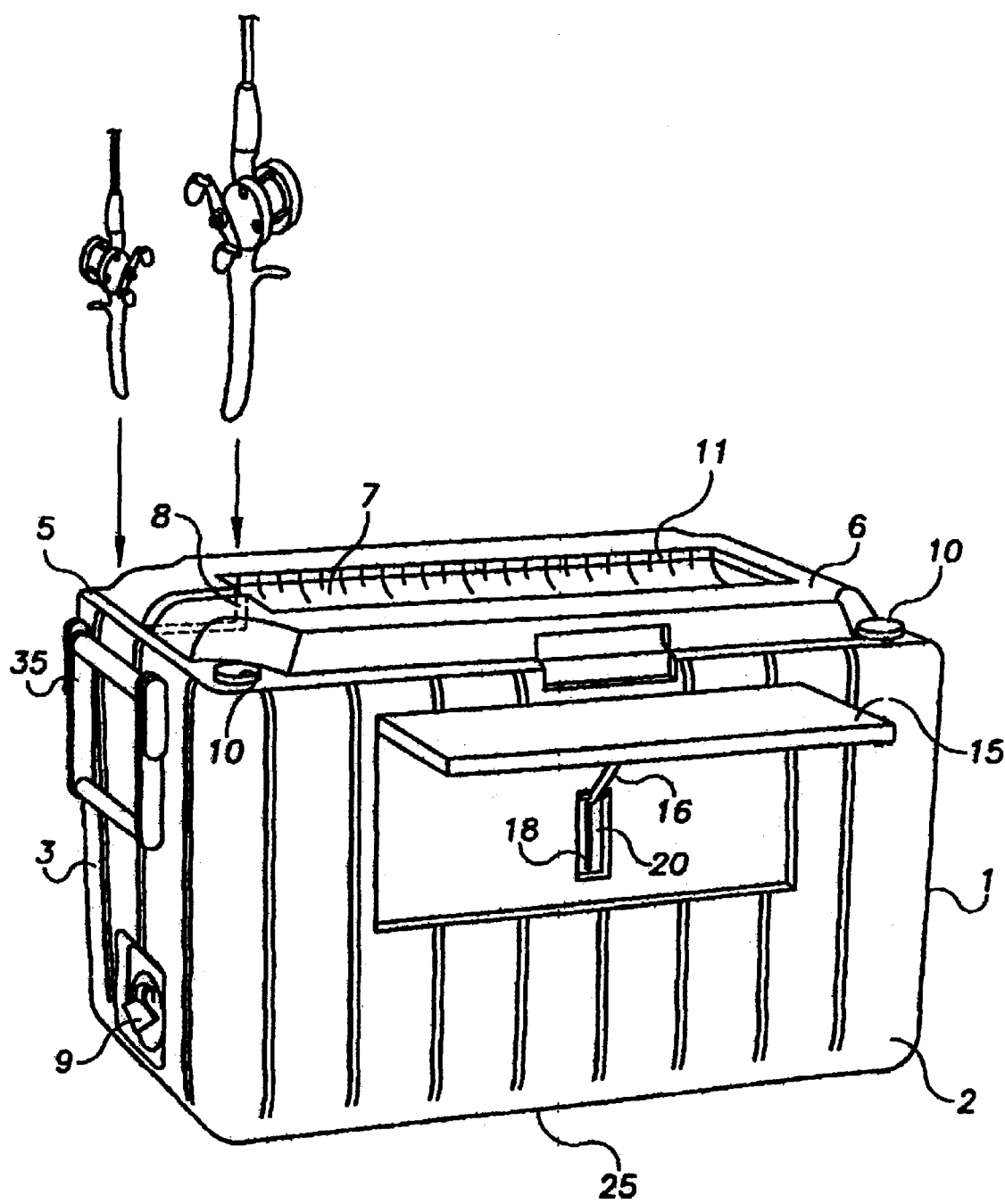
FIG. 1 is a perspective view of the cooler according to the present invention.
Figure 2:
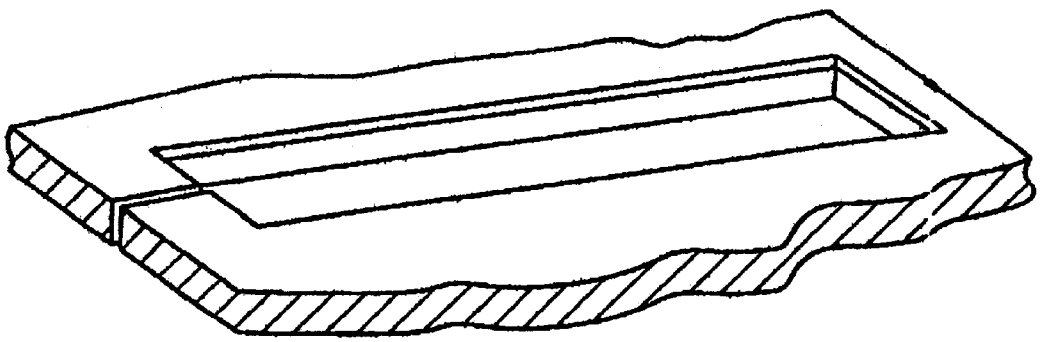
FIG. 2 is a close-up partial cut away view of the recessed portion of the lid.
Figure 3:
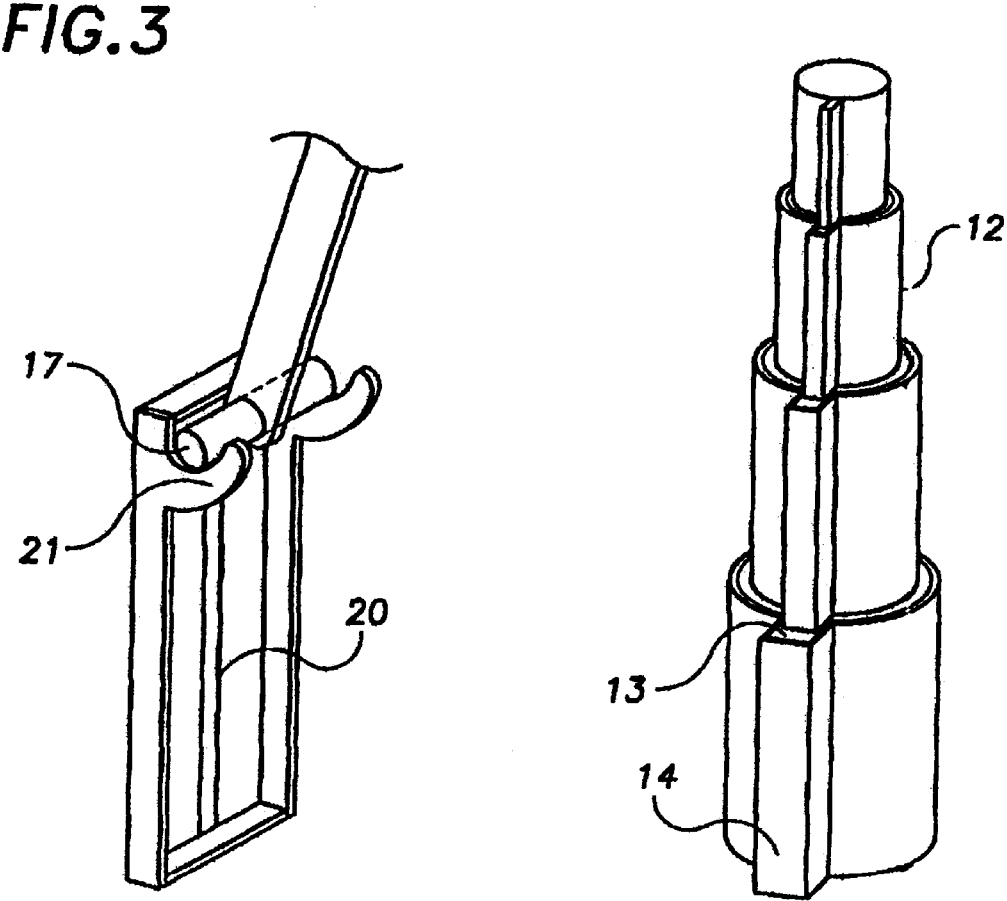
FIG. 3 is a close-up view of the latching mechanism for the accessory shelf.
Figure 4:
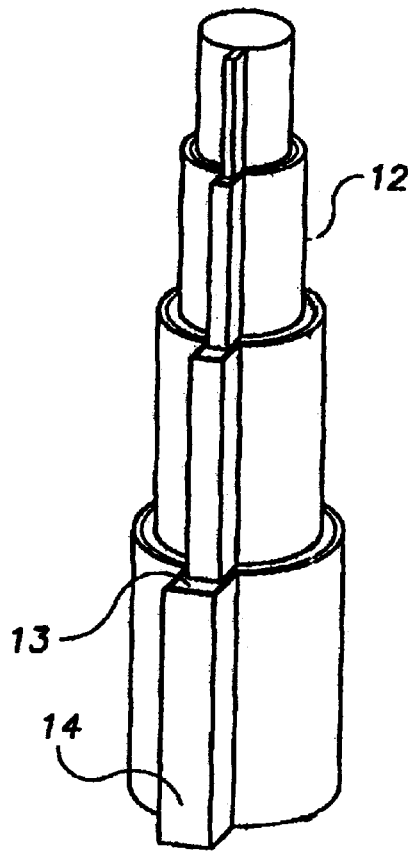
FIG. 4 is a perspective exploded view of a fishing rod holder.

Referring now to FIGS. 1 through 4, the present invention relates to a fisherman's cooler. The device comprises a substantially box shaped container 1 including a bottom surface with a front wall 2, a rear wall and a pair of opposing side walls 3 vertically extending therefrom and a top portion 5. The top portion includes an opening in communication with an interior storage chamber. The bottom surface 25 of the container preferably includes a pad disposed thereon constructed with rubber or a similar slip resistant material. Each side wall preferably includes a handle 35 attached thereto to assist a user in lifting the device.

A lid 6 hingedly engages the top edge of the rear wall for selectively closing the opening on the top portion of the container. The lid includes an upper surface having an elongated recessed portion 7 thereon. Integrally disposed along the recessed portion are a plurality of measuring indicia 11. The recessed portion, therefore, allows a fish to be measured while preventing the fish from sliding or flipping off the lid as often happens with conventional fishernen's coolers. An end of the recessed portion includes a drain channel 8 in communication with a drain spout 9 disposed on a side wall of the container, adjacent the bottom surface thereof, to prevent water from accumulating within the recessed portion.

On the top portion of the container, adjacent each corner thereof, is a fishing rod holder 10 which may be selectively configured to fit varying diameter rods. Each fishing rod holder 10 includes a plurality of concentric cup members 12 of varying diameter which may be added and removed as necessary depending upon the diameter of the fishing rod. Each cup member includes a longitudinal U-shaped groove 13 along its inner surface that forms a U-shaped protrusion 14 on its outer surface. Each U-shaped groove on a cup member receives the exterior protrusion on the cup member received therein for preventing each cup member from rotating relative to the others. The largest outermost cup member is received within a bore on the top portion of the container. The bore also includes a U-shaped groove therein for locking the outermost cup member.

Hingedly engaging the front wall of the container is an accessory shelf 15 which may be pivoted between a vertical and horizontal position. Depending from the bottom surface of the shelf member is a support arm 16 having a cross pin 17 attached thereto. The arm slides within a vertical slot 18 on the front wall of the container. The cross pin slides along a guide plate 20 having a pair of arcuate stop members 21 at the top edge thereof. To lock the shelf in a horizontal position, the front shelf is lifted upwardly until the cross pin rests on top of the arcuate stop members. To pivot the shelf downwardly to a vertical, collapsed position, the front edge of the shelf is lifted upwardly to unseat the cross pin from the stop members; the front edge of the shelf may then be pushed downwardly. The arm may be removed from the slot if necessary to fold the shelf flat against the container. Preferably, the front wall of the container includes a receptacle configured and dimensioned to receive the shelf when the shelf is folded to a collapsed, vertical position allowing the shelf to be unobtrusively stored when not in use. The shelf may be used to store various accessory items that may be used while fishing such as beverages or cellular telephones.

The container according to the present invention is preferably constructed with plastic and a foam insulated material similar to conventional ice chests and coolers. However, as will be readily apparent to those skilled in the art, the size, shape and materials of construction of the above described components may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A fishermen's cooler comprising:

a substantially hollow container having an exterior surface and a top portion with an opening thereon;

a plurality of variable diameter fishing rod holders disposed on the top portion of said container; each of said fishing rod holders including a plurality of varying diameter concentric cup members, any number of which are removed to form a receptacle having a desired diameter; each of said cup members including a longitudinal groove for receiving a longitudinal protrusion on an adjacent cup member to prevent each of said cup members from rotating relative to the others.

2. A fishermen's cooler according to claim 1 further comprising a pivotable lid for selectively covering said opening, said lid having an upper surface with a recessed portion thereon, said recessed portion having a plurality of measuring indicia thereon for measuring a fish.

3. A fishermen's cooler according to claim 2 wherein said recessed portion includes a drain channel in fluid communication with a drain plug on the exterior surface of said cooler.

4. A fishermen's cooler according to claim 1 further comprising a shelf hingedly engaging the exterior surface of said container, said shelf pivotable between a horizontal and vertical position, and said shelf lockable in said horizontal position.

* * * * *